Patented Nov. 14, 1944

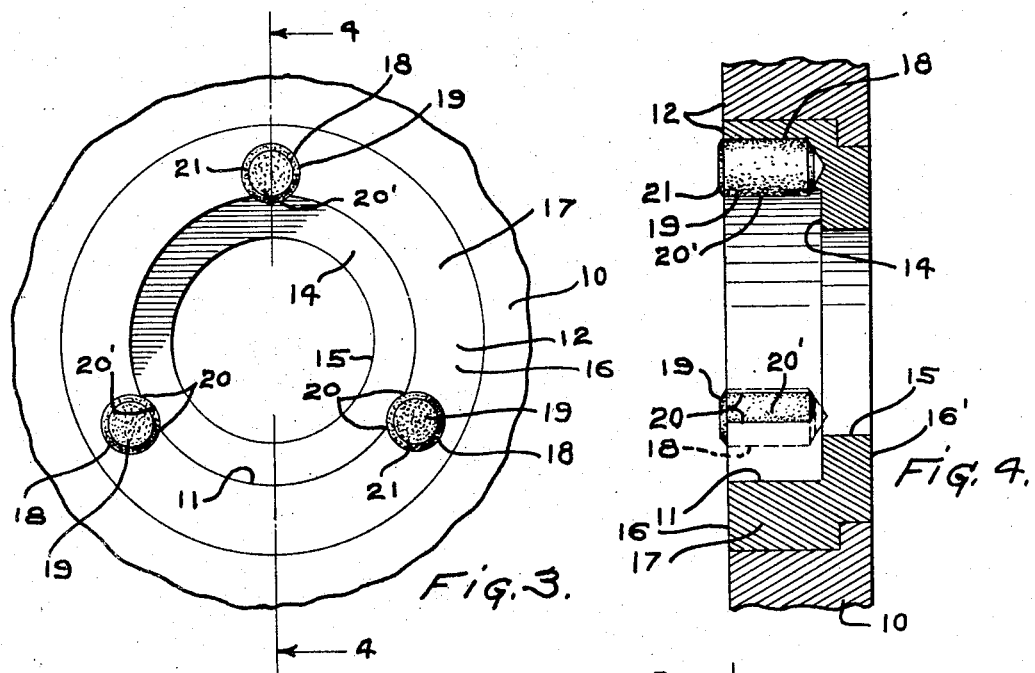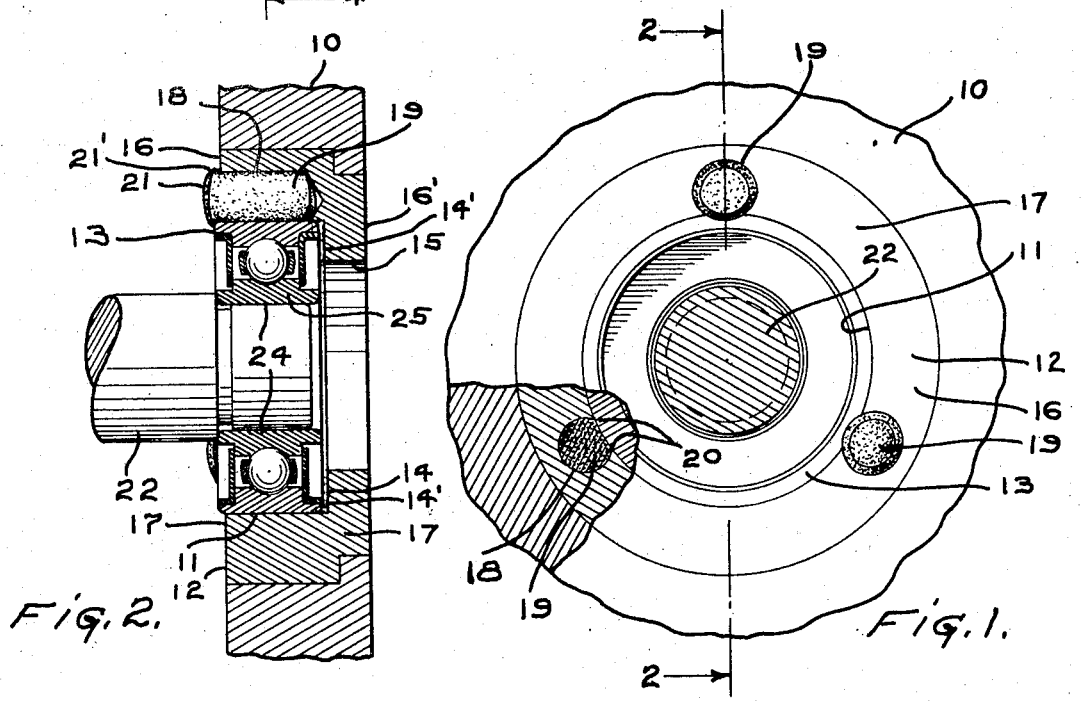

2,362,938

UNITED STATES PATENT OFFICE 2,362,938

BEARING SUPPORT

Harold O. Short, Baltimore County, Md., assignor to The Black and Decker Manufacturing Company, a corporation of Maryland Application June 9, 1944, Serial No. 539,491

4 Claims. (Cl. 308—184)

The invention relates to a resilient or yielding bearing support whereby vibration and rotation of the outer bearing race are prevented, a degree of yielding rotatively and in the direction of the axis being provided.

In the form shown, the yielding support is formed of rubber, other equivalent material being usable.

The resilient element is in the form of one or more plugs or pins parallel to the bearing axis. These plugs or pins are seated in holes which are likewise parallel to the axis and so formed in the frame of the machine, and particularly in the walls of the bearing cavity, that each hole intersects the inner surface of the bearing cavity. When the plugs are inserted in the holes, a section of each plug of a length equal to the depth of the hole and parallel to the axis, projects into the bearing cavity. When the outer race is inserted in the cavity, it compresses the projecting portion of the rubber, maintaining a tension which prevents rotation of the outer race and cushions the bearing. The plugs are prevented from coming out when the bearing is removed due to the greater area of plug surface in contact with the hole as compared to the area in contact with the surface of the outer race. The extent to which the plugs project into the bearing cavity and the number of plugs are determined by, and in a general way are proportionate to, the size of the bearing and speed of rotation, an important point being that the friction of the plugs must be sufficient to prevent rotation of the race.

Preferably the pins project from the face of the bearing and compression of the body of each plug causes the free end to bulge over the surface of the metal in the form of an overhang or offset head.

The friction of the plugs applied to the outer race resists displacement of the bearing in an axial direction and the offset of the head prevents the plug from being pushed into its hole causing a swell-out which might shear off and prevent the proper assembly of the bearings due to the sheared piece of rubber lodging behind the bearing. The overhang also contributes resistance to the displacement of the race and the bearing in an axial direction.

The support of the outer race by the resilient plugs in the manner described performs a cushioning function which is highly effective in dampening or reducing vibration.

In the accompanying drawing I have illustrated a single embodiment of the invention, a degree of revision as to form and arrangement being contemplated.

In the drawing

Fig. 1 is a front or face view of a bearing supported in accordance with the invention, a portion being broken away to include a fragmentary section at right angles to the axis and extending through one of the pins or plugs.

Fig. 2 is a section on the line 2—2 in Fig. 1, looking in the direction of the arrow.

Fig. 3 is a view similar to Fig. 1, with the bearing including the inner and outer races and also the shaft removed.

Fig. 4 is a section on the line 4—4 in Fig. 3 looking in the direction of the arrow.

Referring to the drawing by numerals; the frame or bearing support 10 is formed or provided with a bearing cavity 11 which in the form shown is cylindrical and provided near its rear end, opposite the face 12, with a peripheral shoulder 14 at right angles to the axis whereby the diameter of the cavity is reduced as to the portion 15 of said cavity adjacent the rear face or surface 16', and beyond the bearing.

In the form shown, the cavity 11 is formed in a bushing or bearing housing 17 which is in turn seated in the frame 10 with its ends or front and back surfaces 16, 16' flush with the frame. The outer race of the bearing as shown at 13 enters the cavity 11 with a free sliding fit. There is normally a clearance at 14' between the end of race 13 and the shoulder 14.

The holes 18 which contain the plugs or pins 19, as previously suggested, are in the form of the invention shown formed in the bushing or housing 17 with their axes parallel with the axis of the bearing.

The centers of these holes 18 are so close to the surface or wall of the cavity 11 that the walls of the holes 18 intersect the wall of the chamber, or cavity 11, forming or providing an opening 20 parallel to the respective axes connecting each hole 18 with the chamber. Through this opening each plug 19, or rather a section 20' thereof, parallel to the axis, projects into the bearing cavity 11. The depth or length of the holes 18 is preferably equal to the greatest available length of the outer or larger portion of the chamber or cavity 11 as distinguished from the reduced portion 15 beyond the shoulder 14, it being understood that the chamber 11 may be otherwise formed and arranged. It may also be noted that the openings 20, while of considerable size, are relatively small as compared to the total inner wall surface of each corresponding hole 18.

Into the holes 18 of which there may be one, two, three or any suitable number, the plugs 19 are inserted. These plugs fit closely enough to prevent falling out prior to the insertion of the bearing.

As will be noted in Fig. 4, the plugs are preferably beveled or round at their outer ends at 21 to facilitate the entrance of the bearings into the cavity, the length of the plugs in relation to the holes being preferably such that the beveled portion 21 protrudes substantially as shown in Fig. 4. The insertion of the outer race 13 into cavity 11 compresses the protruding portions 20' of each plug and causes the ends of the plugs as seen at 21 in Fig. 4 to expand slightly outside of the hole as best shown at 21' in Fig. 2. This slight offset or upsetting prevents the plug from being pushed into its hole causing a swell-out of the portion 20' through the opening 20. Such swell-out tends to become sheared off by the outer race and the rubber particles thus separated tend to lodge behind the race and to thus prevent proper assembling of the bearing.

The fit of the plugs in the holes as aforesaid may be only sufficient to prevent falling out of the plugs prior to assembling the bearing.

The plugs are prevented from coming out during the removal of the bearing or outer race because of the greater amount of friction of each plug in its hole as compared to the friction of the protruding portion 20' due to its contact with the peripheral surface of the outer race.

It may be noted as to the characteristic assembly of the parts, as best shown in Fig. 2, that the plugs 18 being duly inserted in the holes 19, the shaft 22 has a reduced end portion 24 which is pressed, or otherwise forced, into the inner race 25 which being duly assembled, the outer race 17 is inserted with the latter in the bearing cavity 11.

The outer race 13, preferably having a free sliding fit in the cavity 11 in the bushing 17 or other support, is held against endwise movement of the bearing by the friction between the outer surface of the outer race 13 and the protruding section 20' of the plug or plugs. The width of each opening 20 as shown is about one-fifth of the circumference of hole 18. In all instances the openings must be less than one-half the diameter of the hole.

By increase or decrease of the number of holes 18 and plugs 19 and increase or decrease of the openings 20 and protruding portions 20', the friction and support afforded by the rubber may be varied as required, being generally proportionate to the size of the bearing and the speed of rotation.

What I claim as new and desire to secure by Letters Patent is:

1. A bearing support comprising a supporting member, having a cavity adapted to receive the outer race of a bearing, whereby said outer race is free to slide in the cavity, said cavity having in its walls a hole parallel to the bearing axis and open at its side into said cavity, said opening being less than half the diameter of the hole, and extending substantially the entire axial length of said cavity in a direction parallel to its axis, and a rubber plug in said hole, and having a side portion elongated in parallelism with said axis and protruding through said opening into said cavity, said portion being engaged and compressed by the outer race to provide a resilient securing means for the outer race which is frictionally engaged by said projecting portion.

2. A bearing support as per claim 1 in which the plug protrudes from the front face of the bearing, and is expanded by said compression.

3. A bearing support as per claim 1 in which the plug protrudes from the front face of the bearing, the protruding portion being beveled or rounded to facilitate the entrance of the bearing into said cavity.

4. A bearing support as per claim 1 in which there are a plurality of said holes and plugs spaced about the periphery of said cavity.

HAROLD O. SHORT.